United States Patent
Mages et al.

(10) Patent No.: US 11,472,248 B2
(45) Date of Patent: Oct. 18, 2022

(54) SUSPENSION STRUT AND VEHICLE

(71) Applicants: ThyssenKrupp Bilstein GmbH, Ennepetal (DE); thyssenkrupp AG, Essen (DE)

(72) Inventors: Stefan Mages, Hürth (DE); Sebastian Dirmeier, Dortmund (DE); Vanessa Hofsommer, Bochum (DE); Daniel Hansen, Bochum (DE)

(73) Assignees: THYSSENKRUPP BILSTRIN GMBH, Ennepetal (DE); THYSSENKRUPP AG, Essen (DE)

( * ) Notice: Subject to any disclaimer, the term of this patent is extended or adjusted under 35 U.S.C. 154(b) by 464 days.

(21) Appl. No.: 16/531,795

(22) Filed: Aug. 5, 2019

(65) Prior Publication Data

US 2020/0039312 A1 Feb. 6, 2020

(30) Foreign Application Priority Data

Aug. 6, 2018 (DE) ...................... 10 2018 119 086.7

(51) Int. Cl.
  *B60G 15/04* (2006.01)
  *B60G 17/02* (2006.01)

(52) U.S. Cl.
  CPC ........... *B60G 15/04* (2013.01); *B60G 17/021* (2013.01); *B60G 2202/312* (2013.01); *B60G 2500/30* (2013.01)

(58) Field of Classification Search
  CPC .. B60G 15/062; B60G 15/04; B60G 17/0272; B60G 17/021; B60G 2202/413; B60G 2204/1242; B60G 2500/30; B60G 2202/312

USPC ........................................................ 267/202
See application file for complete search history.

(56) References Cited

U.S. PATENT DOCUMENTS

| | | | | |
|---|---|---|---|---|
| 5,996,978 | A  * | 12/1999 | Asanuma | B60G 17/0408 |
| | | | | 188/315 |
| 9,868,489 | B2 * | 1/2018 | Murakami | F16F 1/121 |
| 10,570,976 | B1 * | 2/2020 | Evans | B60G 15/068 |
| 10,632,805 | B1 * | 4/2020 | Rositch | B60G 3/01 |
| 11,125,298 | B2 * | 9/2021 | Dobinson | F16F 9/346 |
| 2016/0229253 | A1 * | 8/2016 | Seminara | B60G 17/0272 |
| 2016/0272272 | A1 * | 9/2016 | Murakami | B62K 25/04 |
| 2017/0282993 | A1 * | 10/2017 | Miyata | F16F 1/121 |

(Continued)

FOREIGN PATENT DOCUMENTS

| | | |
|---|---|---|
| CN | 105555559 A | 5/2016 |
| CN | 107107700 A | 8/2017 |

(Continued)

*Primary Examiner* — Toan C To
(74) *Attorney, Agent, or Firm* — thyssenkrupp North America, LLC

(57) ABSTRACT

A suspension strut for a wheel suspension of a vehicle may have a vibration damper, a supporting spring that partially surrounds an outer tube of the vibration damper and is supported by a spring collar, and a lifting device for height adjustment of the vehicle. The lifting device may comprise a hollow piston and a cylinder that are arranged concentrically around the outer tube. The hollow piston may be guided axially between the outer tube and the cylinder and is connected to the spring collar to adjust a base point of the supporting spring. The hollow piston may comprise a stripping and sealing element that lies against the vibration damper.

20 Claims, 5 Drawing Sheets

(56) References Cited

U.S. PATENT DOCUMENTS

| | | | | |
|---|---|---|---|---|
| 2017/0282995 | A1* | 10/2017 | Murakami | F16F 1/121 |
| 2019/0178329 | A1* | 6/2019 | Dumitru | B60G 13/005 |
| 2019/0308484 | A1* | 10/2019 | Belter | B60G 17/033 |
| 2021/0146739 | A1* | 5/2021 | Schmidt | B60G 17/044 |
| 2021/0268857 | A1* | 9/2021 | D'Orazio | F16F 9/56 |
| 2021/0268859 | A1* | 9/2021 | Dietrich | B60G 17/0272 |

FOREIGN PATENT DOCUMENTS

| | | |
|---|---|---|
| DE | 198 13 240 C1 | 8/1999 |
| DE | 102007044538 A | 3/2009 |
| DE | 102013222249 A | 4/2015 |
| DE | 102017106682 A | 10/2017 |
| WO | 2014095211 A | 6/2014 |
| WO | 2017102584 A | 6/2017 |

* cited by examiner

SUSPENSION STRUT AND VEHICLE

CROSS REFERENCE TO RELATED APPLICATION

This application claims priority to German Patent Application No. DE 10 2018 119 086.7, filed Aug. 6, 2018, the entire contents of which are incorporated herein by reference.

FIELD

The present disclosure generally relates to suspension struts, including suspension struts for wheel suspensions of vehicles.

BACKGROUND

A low ground clearance is required in automobiles in order to increase the driving dynamics. To prevent bottoming of the vehicle in the case of obstacles, temporary raising of the vehicle front is necessary. To achieve this, a damper module is equipped with a spring base point adjuster. The prior art is to pneumatically extend the damper tube within the module. Given the requirement for relatively high spring rates of the supporting spring and the associated use of a helper spring with a low spring rate, this system cannot be used.

WIPO Patent Publication No. WO 2014/095211 A1 describes a height-adjusting device for a motor vehicle having a cylinder element in which an auxiliary spring and a lifting piston, which movably delimits a pressure space in the cylinder element, are received. The auxiliary spring is arranged in the pressure space. Here, the supporting spring is supported against the lifting piston on the outer side. On the inner side, the auxiliary spring is braced between the lifting piston and the cylinder element. The lifting piston acts as an intermediate spring collar. If the vibration damper is extended, a force directed in the direction of the supporting spring can be applied by the auxiliary spring to the lifting piston and the latter can be pushed out of the cylinder element as far as a stroke-limiting means. On the outer side, the supporting spring is supported against the lifting piston. The pressure space can be placed pneumatically under pressure via a pressure medium connection on the cylinder element. As a result, the lifting piston is extended downwards out of the cylinder element over a defined distance and the vehicle body of the motor vehicle is raised.

The height-adjusting device of the known suspension strut increases the installation space required for the installation of the suspension strut.

Thus a need exists for a compact suspension strut for a vehicle that allows height adjustment of the vehicle to influence the ground clearance, for example when travelling over obstacles. A need also exists for a vehicle having such a suspension strut.

DETAILED DESCRIPTION

Figure 1:
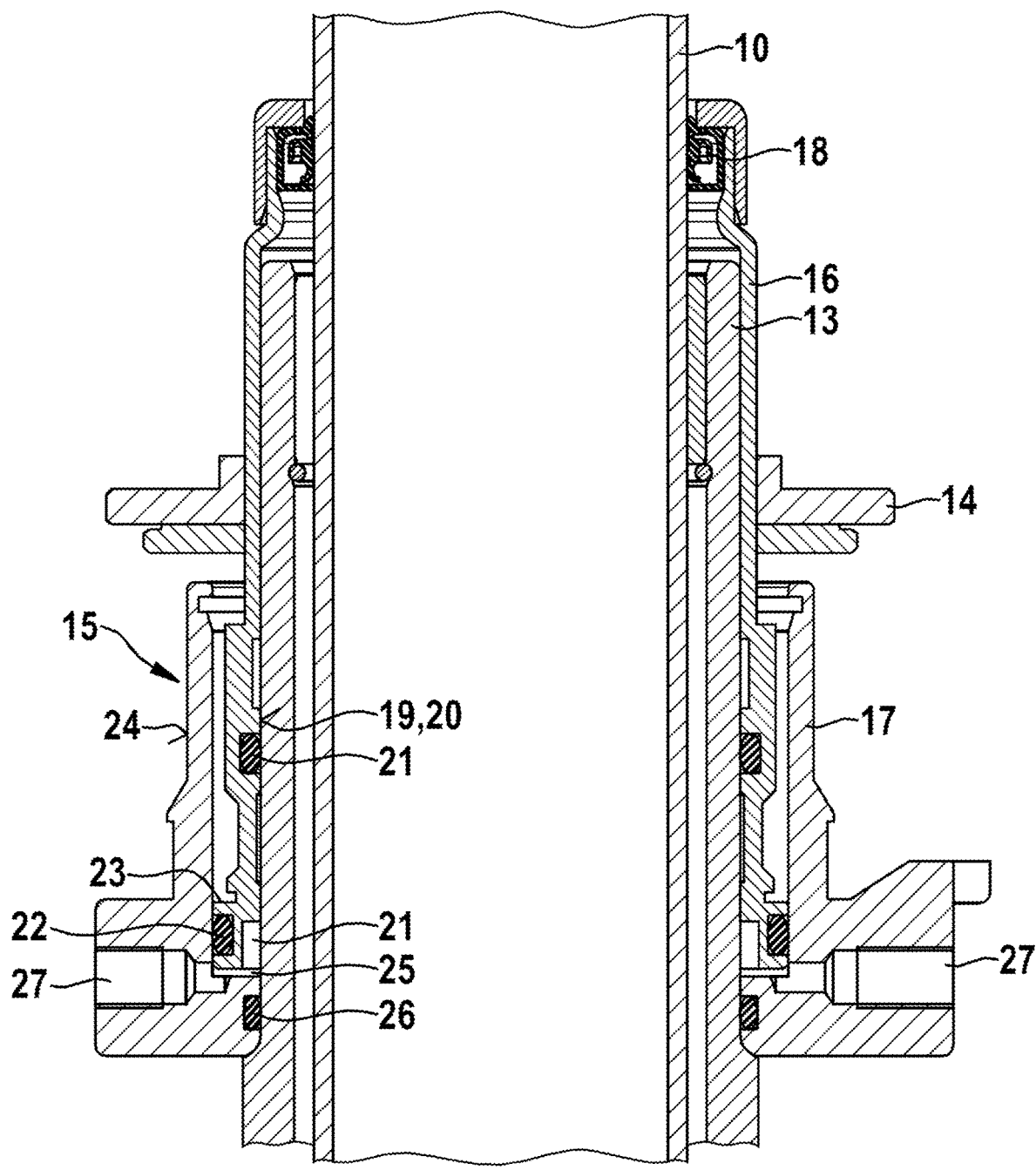
FIG. 1 is a sectional view through a component of an example suspension strut.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a suspension strut for a wheel suspension of a vehicle. In some examples, the suspension strut may include a vibration damper, a supporting spring that partially surrounds an outer tube of the vibration damper and is supported by a spring collar, and a lifting device for height adjustment of the vehicle. The present disclosure further relates to vehicles with such suspension struts.

Specifically, a suspension strut for a wheel suspension of a vehicle may comprise a vibration damper and a supporting spring which partially surrounds an outer tube of the vibration damper and is supported by a spring collar. The suspension strut further comprises a device for height adjustment of the vehicle. The lifting device comprises a hollow piston and a cylinder which are arranged concentrically around the outer tube. The hollow piston is guided axially between the outer tube and the cylinder and is connected to the spring collar to adjust the base point of the supporting spring.

The present disclosure has the advantage that the suspension strut is of compact design and requires relatively little installation space. For this purpose, the hollow piston is guided axially between the outer tube and the cylinder. Here, the outer tube serves for guiding the hollow piston. For height adjustment, the spring collar is connected to the axially movable hollow piston. Displacing the hollow piston adjusts the height position of the spring collar along the longitudinal axis of the vibration damper and thus the base point of the supporting spring. As a result, the spacing of the vehicle from the ground, that is to say the ground clearance, is changed, i.e. increased or decreased.

The present disclosure is suitable both for suspension struts which are used in upside-down installation positions and also for conventional suspension struts which are not mounted in upside-down installation positions.

For example, the hollow piston can comprise a stripping and sealing element which lies against the vibration damper. Here, recourse can be had to a stripper already present on the suspension strut, with the result that no additional sealing element for avoiding dirt in the lifting device is required. Other examples in which an additional or modified stripping and sealing element is provided are possible.

The stripping and sealing element preferably seals the vibration damper and the lifting device. The stripping and sealing element performs a dual function, with the result that the number of components is reduced.

In other examples, the stripping and sealing element may be arranged on the axial end of the hollow piston for a maximum stroke.

The inner side of the hollow piston can be formed at least in certain portions as a sliding surface for sliding on the outer tube. A simple linear guide without additional guide components is thus made possible.

The hollow piston can comprise at least one inner seal which seals against the outer tube. This has the advantage that large lifting pressures for base point adjustment are possible.

The hollow piston can comprise at least one outer seal which seals against the cylinder. This also ensures that large lifting pressures can be applied for the base point adjustment.

The hollow piston preferably comprises an axial stop for the cylinder, with the result that the safety against losing the components is improved.

In some examples, the cylinder forms a cylinder casing which surrounds the hollow piston in the circumferential direction and comprises a pressure chamber for charging the hollow piston with an adjusting pressure or lifting pressure. The cylinder casing improves the compact design of the suspension strut.

If the cylinder has connections for a pressure medium, the latter can be operated pneumatically or hydraulically.

The cylinder preferably comprises at least one seal which seals against the outer tube. This measure contributes towards large forces being able to be applied for base point adjustment.

In the vehicle according to the present disclosure, a suspension strut is integrated into a wheel suspension of the vehicle.

Figure 2:
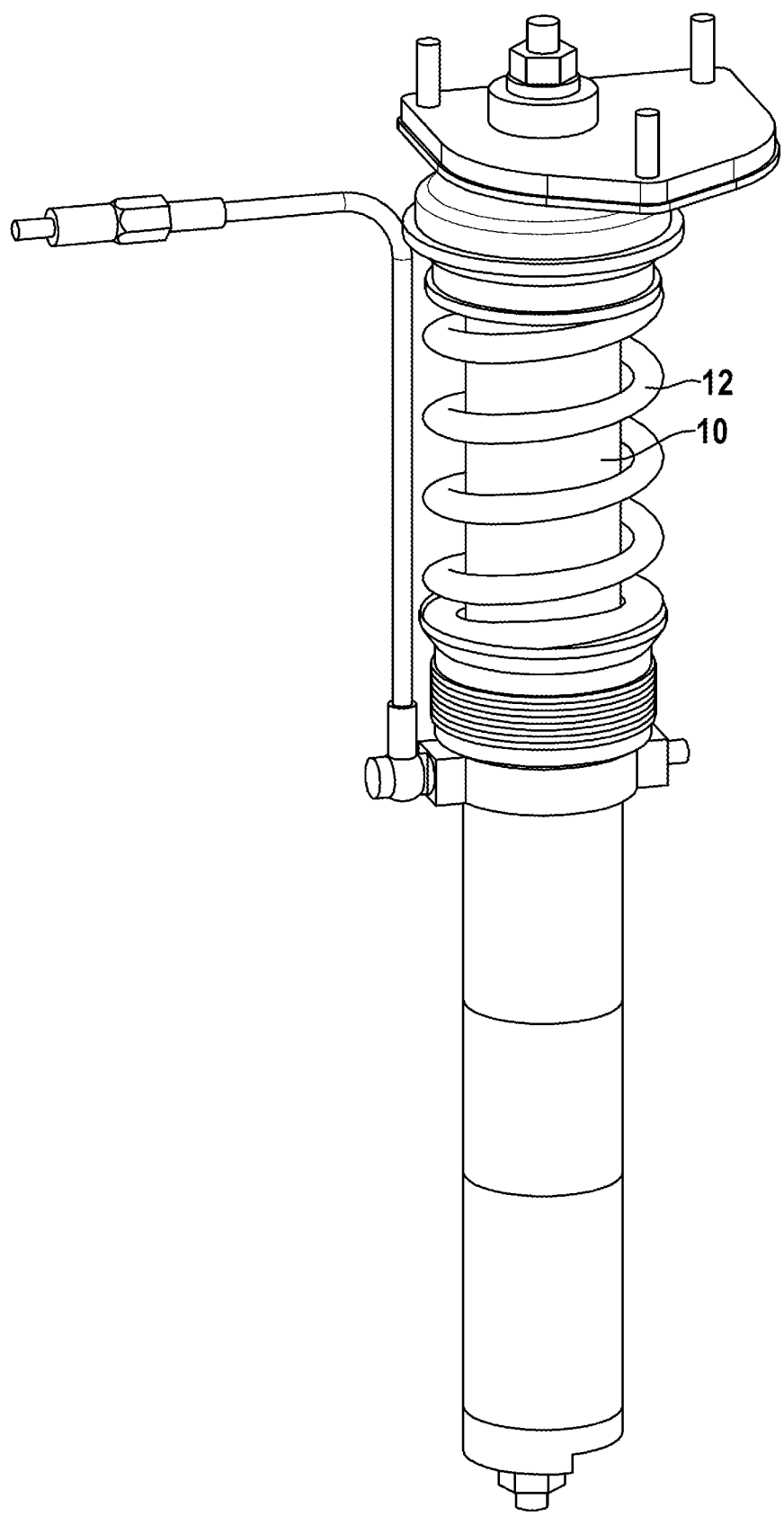
FIG. 2 is a perspective view of the component according to FIG. 1 or of a similar example component.
Figure 3:
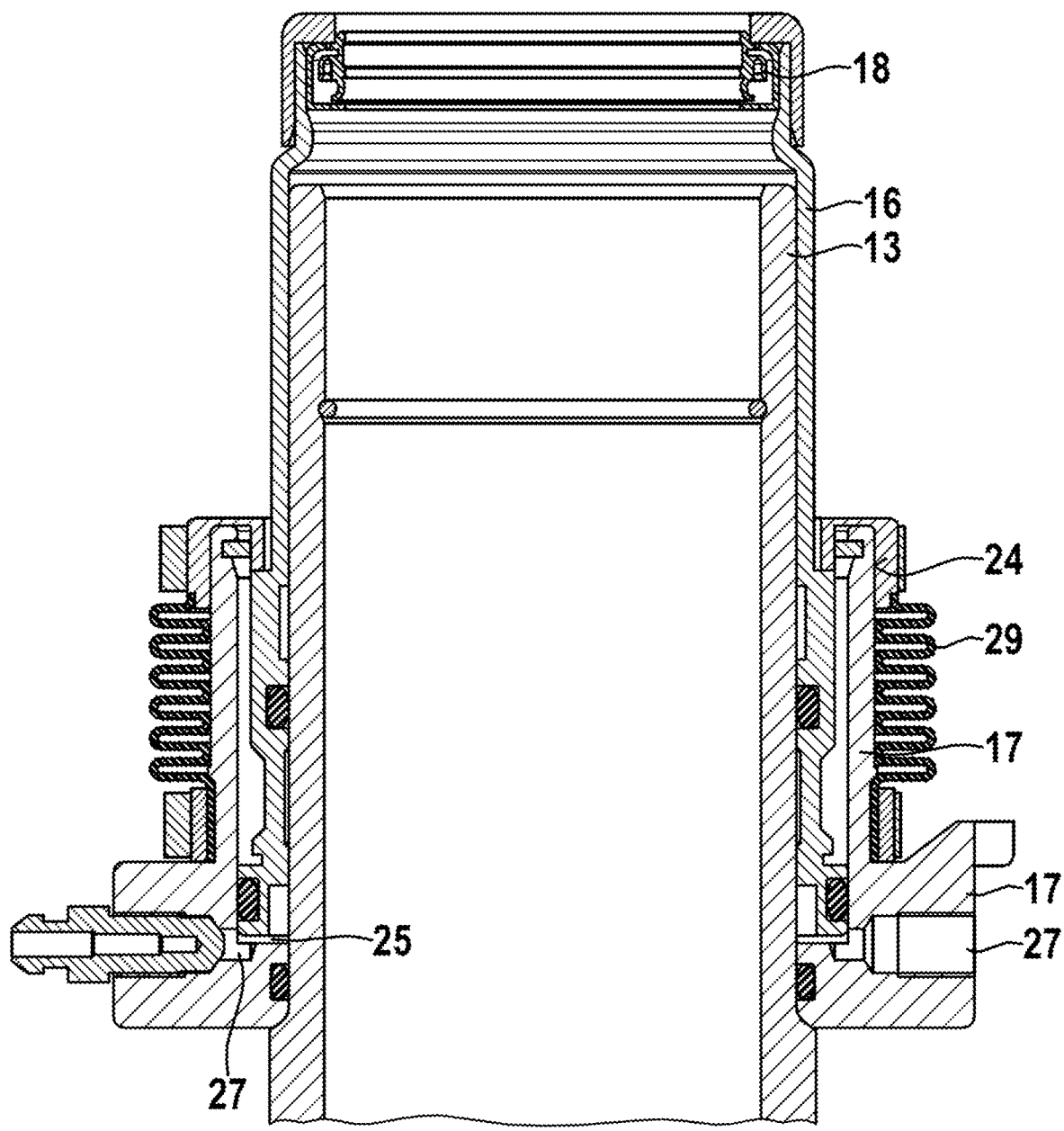
FIG. 3 is a sectional view through the example component according to FIG. 2 without a spring collar.

The component according to FIG. 1 is a vibration damper which is used for example in a McPherson suspension strut in flexible installation positions, for example in an upside-down technique. In the case of the upside-down technique, the piston rod is fastened at the bottom in the tube body (not shown). The suspension strut with vibration damper 10 and supporting spring 12 is shown in FIG. 2. The present disclosure can also be applied to suspension struts which are not used in the upside-down technique.

The vibration damper 10 comprises an outer tube 13 which is a constituent part of a damper cartridge. As illustrated in FIG. 2, the supporting spring 12 partially surrounds the outer tube 13 on its outer circumference. The supporting spring 12 is supported on a spring collar 14 which can clearly be seen in FIG. 1 and in FIGS. 4 and 5. The supporting spring 12 is adjustable relative to the outer tube 13 along the longitudinal axis of the outer tube 13, with the result that the base point of the supporting spring 12 is variable. As a result, a height adjustment of the vehicle is possible.

To adjust the supporting spring 12, there is provided a lifting device 15 which can be actuated hydraulically or pneumatically. The lifting device 15 comprises a hollow piston 16 which is arranged between a cylinder 17 and the outer tube 13. Here, the cylinder 17 is arranged radially outside and the outer tube 13 radially inside with respect to the hollow piston 16. The hollow piston 16, the cylinder 17 and the outer tube 13 are arranged concentrically. Here, the outer tube 13 has the function of guiding the hollow piston 16 axially along the longitudinal axis of the vibration damper. The hollow piston 16 slides on the outer tube 13.

The cylinder 17 forms a cylinder casing 24 which comprises a pressure chamber 25 in the region of an axial end, in particular of the lower (in the installation position) axial end of the cylinder 17. The pressure chamber 25 is delimited on the one hand by an end face of the hollow piston 16 and on the other hand by the wall of the cylinder casing 24. The pressure chamber 25 is fluidically connected to a connection 27 for a pressure medium, for example air or oil. The pressure chamber 25 forms an annular gap between the outer surface of the outer tube 13 and the inner surface of the cylinder casing 24.

In some of the examples illustrated in the drawings, two connections 27 are arranged radially opposite one another. Connections 27 oriented in some other way are also conceivable. For example, the two connections 27 can be arranged directly next to one another, i.e. on the same side, on the cylinder.

Figure 5:
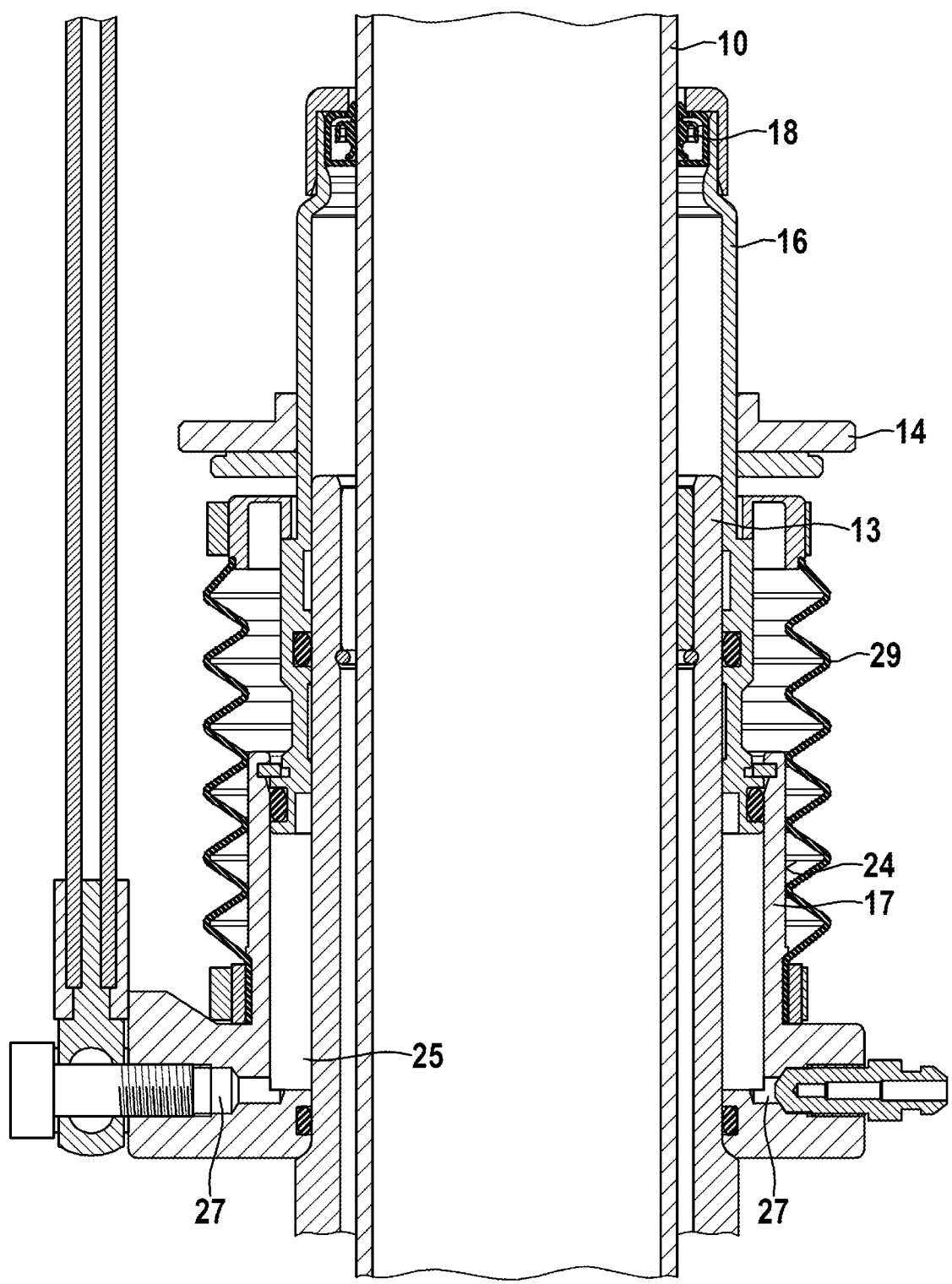
FIG. 5 is a sectional view of the example component according to FIG. 4 in an extended state.

Charging the pressure chamber 25 with an adjusting pressure or lifting pressure causes the hollow piston 16 to be moved in the axial direction of the vibration damper (see FIG. 5). As a result, the volume of the pressure chamber 25 increases.

The spring collar 14 on which the supporting spring 12 is supported is connected, for example screwed, to the outer circumference of the hollow piston 16. For this purpose, the hollow piston 16 has a thread. Other types of connection are possible. The spring collar 14 and the hollow piston 16 can be formed in one piece, i.e. monolithically.

By virtue of the mechanical connection between the spring collar 14 and the hollow piston 16, the spring collar 14 is carried along during the adjustment of the hollow piston 16 and moved in the axial direction along the longitudinal axis of the vibration damper 10. The base point of the supporting spring 12 is adjusted by this movement.

The cylinder casing 24 terminates with the outer surface of the outer tube 13 at both axial ends of the cylinder casing 24. For this purpose, the cylinder casing 24 comprises, at the lower end of the cylinder casing 24 shown in FIG. 1, a cylinder seal 26 which seals against the outer tube 13. The tightness of the pressure chamber 25 is achieved by an inner seal 21 and an outer seal 22 which are each formed on the axially lower end of the hollow piston 16. Here, the inner seal 21 seals against the outer tube 13, and the outer seal 22 seals against the cylinder casing 24. A second inner seal 21 can also seal against the outer tube 13 in the axial direction at a distance from the lower inner seal 21. It is also possible to use only the upper (in FIG. 1) inner seal 21.

The expressions "lower" and "upper" relate to the position of the vibration damper that is shown in FIGS. 1 to 5.

The hollow piston 16 has a machined inner surface which forms a sliding surface 20. The hollow piston 16 slides on the outer tube 13 on this sliding surface 20. In a corresponding manner, an outer surface of the outer tube 13 can also be machined as a corresponding sliding surface. The hollow piston 16 comprises, at the axially lower end, an axial stop 23 which extends outwardly in the radial direction. The radial stop 23 interacts with a counter-piece of the cylinder 17 and has the effect that the movement of the hollow piston 16 during extension is limited if the maximum stroke of the hollow piston 16 has been achieved.

As can be seen in FIG. 1, the hollow piston 16 comprises a stripping and sealing element 18 which lies against the vibration damper 10, specifically against the outer tube 13.

It can be seen in FIGS. 2 to 5 that the cylinder casing 24 comprises on its outer surface a bellows 29 which is connected to the hollow piston 16 in order to protect the latter in the extended state (see FIG. 5).

Figure 4:
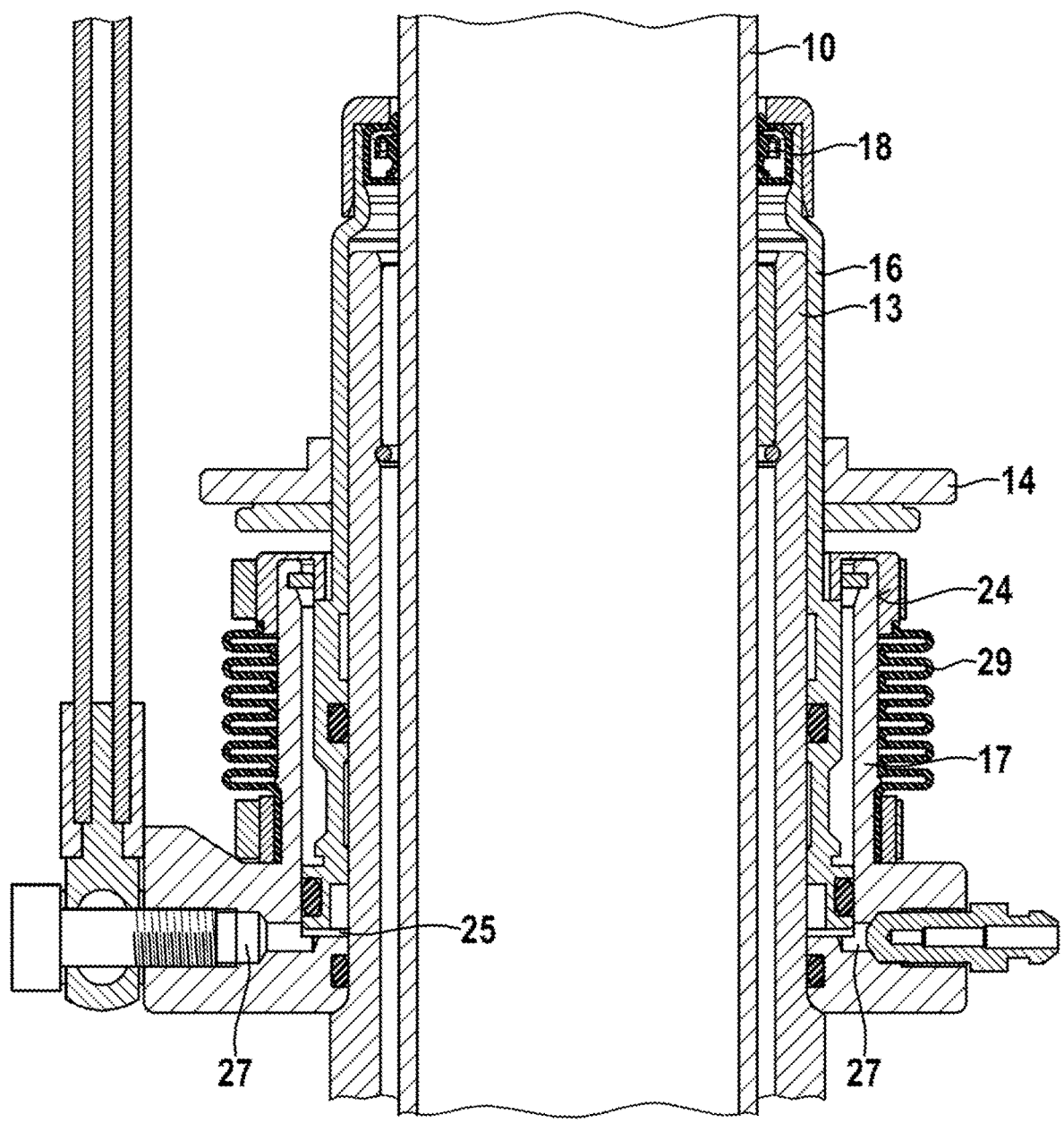
FIG. 4 is a sectional view through the example component according to FIG. 2 with a spring collar and in a retracted state.

FIGS. 4 and 5 illustrate the mode of operation of the lifting device 15.

In the retracted state according to FIG. 4, the hollow piston 16 is completely retracted into the cylinder casing 24, wherein the spring collar 14 is arranged close to the upper (in FIGS. 4 and 5) end face of the cylinder casing 24 (see also FIG. 1). Here, the variable volume of the pressure chamber 25 is minimal. If the pressure chamber 25 is charged with pressure, the hollow piston 16 extends out of the cylinder casing 24 and, in the completely extended state, strikes against the cylinder casing 24 by way of the stop 23, with the result that the movement of the hollow piston 16 is stopped. In this state, the hollow piston 16 is completely extended and the spring collar 14 is at its maximum distance from the cylinder casing 24. Consequently, the base point of the supporting spring (see FIG. 2) is correspondingly adjusted in order to change the ground clearance of the vehicle.

The vibration damper illustrated in the figures or the suspension strut equipped with the vibration damper allows an increased lifting force by comparison with the existing lift systems. In addition, the suspension strut is of compact design, particularly being short in the axial direction.

LIST OF REFERENCE SIGNS

10 Vibration damper
11 Left free
12 Supporting spring
13 Outer tube
14 Spring collar
15 Lifting device
16 Hollow piston
17 Cylinder
18 Stripping and sealing element
19 Inner side of the hollow piston
20 Sliding surface
21 Inner seal
22 Outer seal
23 Stop
24 Cylinder casing
25 Pressure chamber
26 Cylinder seal
27 Connections
29 Bellows

What is claimed is:

1. A suspension strut for a wheel suspension of a vehicle, the suspension strut comprising:
   a vibration damper;
   a supporting spring that partially surrounds an outer tube of the vibration damper and is supported by a spring collar; and
   a lifting device for height adjustment of the vehicle, wherein the lifting device comprises a hollow piston and a cylinder that are arranged concentrically around the outer tube, wherein the hollow piston is guided axially between the outer tube and the cylinder and is connected to the spring collar to adjust a base point of the supporting spring, wherein the hollow piston comprises a stripping and sealing element that lies against the vibration damper.

2. The suspension strut of claim 1 wherein the stripping and sealing element seals the vibration damper and the lifting device.

3. The suspension strut of claim 1 wherein the stripping and sealing element is fixed at an axial end of the hollow piston.

4. The suspension strut of claim 1 wherein an inner side of the hollow piston comprises a sliding surface for the outer tube.

5. The suspension strut of claim 1 wherein the hollow piston comprises an inner seal that seals against the outer tube.

6. The suspension strut of claim 1 wherein the hollow piston comprises an outer seal that seals against the cylinder.

7. The suspension strut of claim 1 wherein the hollow piston comprises an axial stop for the cylinder.

8. The suspension strut of claim 1 wherein the cylinder forms a cylinder casing that surrounds the hollow piston in a circumferential direction and comprises a pressure chamber for charging the hollow piston with an adjusting pressure.

9. The suspension strut of claim 1 wherein the cylinder comprises connections for a pressure medium.

10. A suspension strut for a wheel suspension of a vehicle, the suspension strut comprising:
    a vibration damper;
    a supporting spring that partially surrounds an outer tube of the vibration damper and is supported by a spring collar; and
    a lifting device for height adjustment of the vehicle, wherein the lifting device comprises a hollow piston and a cylinder that are arranged concentrically around the outer tube, wherein the hollow piston is guided axially between the outer tube and the cylinder and is connected to the spring collar to adjust a base point of the supporting spring, wherein the cylinder comprises a seal that seals against the outer tube.

11. The suspension strut of claim 10 wherein the hollow piston comprises a stripping and sealing element that lies against the vibration damper.

12. The suspension strut of claim 11 wherein the stripping and sealing element seals the vibration damper.

13. The suspension strut of claim 10 wherein an inner side of the hollow piston comprises a sliding surface for the outer tube.

14. The suspension strut of claim 10 wherein the hollow piston comprises an inner seal that seals against the outer tube.

15. A suspension strut for a wheel suspension of a vehicle, the suspension strut comprising:
    a vibration damper;
    a supporting spring that partially surrounds an outer tube of the vibration damper and is supported by a spring collar; and
    a lifting device for height adjustment of the vehicle, wherein the lifting device comprises a hollow piston and a cylinder that are arranged concentrically around the outer tube, wherein the hollow piston is guided axially between the outer tube and the cylinder and is connected to the spring collar to adjust a base point of the supporting spring, wherein an inner side of the hollow piston comprises a sliding surface, wherein the outer tube is in contact with the sliding surface of the hollow piston and is configured to slide along the sliding surface.

16. The suspension strut of claim 15 wherein the hollow piston comprises:
    a stripping and sealing element that lies against the vibration damper; and
    an outer seal that seals against the cylinder.

17. The suspension strut of claim 16 wherein the stripping and sealing element is fixed at an axial end of the hollow piston and seals the vibration damper.

18. The suspension strut of claim 15 wherein the hollow piston comprises an inner seal that seals against the outer tube.

19. The suspension strut of claim 15 wherein the hollow piston is disposed directly between and in contact with the outer tube and the cylinder.

20. The suspension strut of claim 15 comprising:
   a first seal disposed directly between the hollow piston and the outer tube; and
   a second seal disposed directly between the outer tube and the cylinder.

\* \* \* \* \*